US008812819B1

(12) United States Patent
Langhammer et al.

(10) Patent No.: US 8,812,819 B1
(45) Date of Patent: Aug. 19, 2014

(54) METHODS AND APPARATUS FOR REORDERING DATA SIGNALS IN FAST FOURIER TRANSFORM SYSTEMS

(75) Inventors: Martin Langhammer, Salisbury (GB); Kellie Marks, Lane End (GB)

(73) Assignee: Altera Corporation, San Jose, CA (US)

( * ) Notice: Subject to any disclaimer, the term of this patent is extended or adjusted under 35 U.S.C. 154(b) by 305 days.

(21) Appl. No.: 13/212,377

(22) Filed: Aug. 18, 2011

(51) Int. Cl.
*G06F 12/00* (2006.01)

(52) U.S. Cl.
USPC ............................. 711/219; 711/103

(58) Field of Classification Search
CPC ................................. G06F 17/14; G06F 12/00
USPC .................... 711/103, 219; 708/404
See application file for complete search history.

(56) References Cited

U.S. PATENT DOCUMENTS

| | | | |
|---|---|---|---|
| 6,351,758 B1 * | 2/2002 | Courtney et al. | 708/404 |
| 7,543,010 B2 * | 6/2009 | Swartzlander et al. | 708/404 |
| 2002/0199078 A1 * | 12/2002 | Aizenberg et al. | 711/211 |
| 2005/0160127 A1 * | 7/2005 | Swartzlander et al. | 708/404 |
| 2005/0177608 A1 * | 8/2005 | Lee | 708/404 |
| 2008/0288569 A1 * | 11/2008 | Gibb et al. | 708/404 |

OTHER PUBLICATIONS

Chu, E., et al. *Inside The FFT Black Box: Serial and Parallel Fast Fourier Transform Algorithms*, CRC Press, 2000.

* cited by examiner

*Primary Examiner* — Aimee Li
*Assistant Examiner* — Christopher Do
(74) *Attorney, Agent, or Firm* — Ropes & Gray LLP; Jeffrey H. Ingerman

(57) ABSTRACT

Data signal items output by a radix $4^n 2^m$ fast Fourier transform ("FFT") operation may not be in the order desired for further use of those data items (e.g., they may be output in a non-natural order rather than in a desired natural order). Memory circuitry (e.g., dual-port memory circuitry) may be used in conjunction with circuitry for addressing the memory circuitry with address signals that are reordered in a particular way for each successive set of N data items. This allows use of memory circuitry with fewer data item storage locations than would otherwise be required to reorder the data items from non-natural to natural order. In particular, the memory circuitry only needs to be able to store N data items at any one time, which is more efficient memory utilization than would otherwise be possible.

22 Claims, 11 Drawing Sheets

| Col. A Input Data (Out of Order) | Col. B Read & Write Addresses | Col. C Data in Memory | | Col. D Read & Write Addresses | Col. E Data in Memory | | Col. F Read & Write Addresses | Col. G Data in Memory | |
|---|---|---|---|---|---|---|---|---|---|
| 0 | 00000 | 0 | 0 | 00000 | 0 | 0 | 00000 | 0 | 0 |
| 16 | 00001 | 1 | 1 | 01000 | 8 | 1 | 00100 | 4 | 1 | 4 |
| 4 | 00010 | 2 | 2 | 10000 | 16 | 2 | 00001 | 1 | 2 | 1 |
| 20 | 00011 | 3 | 3 | 11000 | 24 | 3 | 00101 | 5 | 3 | 5 |
| 8 | 00100 | 4 | 4 | 00010 | 2 | 4 | 10000 | 16 | 4 | 16 |
| 24 | 00101 | 5 | 5 | 01010 | 10 | 5 | 10100 | 20 | 5 | 20 |
| 12 | 00110 | 6 | 6 | 10010 | 18 | 6 | 10001 | 17 | 6 | 17 |
| 28 | 00111 | 7 | 7 | 11010 | 26 | 7 | 10101 | 21 | 7 | 21 |
| 1 | 01000 | 8 | 8 | 00100 | 4 | 8 | 00010 | 2 | 8 | 2 |
| 17 | 01001 | 9 | 9 | 01100 | 12 | 9 | 00110 | 6 | 9 | 6 |
| 5 | 01010 | 10 | 10 | 10100 | 20 | 10 | 00011 | 3 | 10 | 3 |
| 21 | 01011 | 11 | 11 | 11100 | 28 | 11 | 00111 | 7 | 11 | 7 |
| 9 | 01100 | 12 | 12 | 00110 | 6 | 12 | 10010 | 18 | 12 | 18 |
| 25 | 01101 | 13 | 13 | 01110 | 14 | 13 | 10110 | 22 | 13 | 22 |
| 13 | 01110 | 14 | 14 | 10110 | 22 | 14 | 10011 | 19 | 14 | 19 |
| 29 | 01111 | 15 | 15 | 11110 | 30 | 15 | 10111 | 23 | 15 | 23 |
| 2 | 10000 | 16 | 16 | 00001 | 1 | 16 | 01000 | 8 | 16 | 8 |
| 18 | 10001 | 17 | 17 | 01001 | 9 | 17 | 01100 | 12 | 17 | 12 |

| LINE NO. | |
|---|---|
| 1 | // N is size of largest transform |
| 2 | // M is log2(N) |
| 3 | // n is size of this transform |
| 4 | // m = log2(n) |
| 5 | // prevn was previous value of n |
| 6 | // mplusone = m+1 |
| | |
| 7 | if reset = '1' then |
| 8 |   for i in 0 to M-1 loop |
| 9 |     reg(i) <= i; |
| 10 |   end loop; |
| 11 | end if; |
| 12 |   // updated each time we get a new value of n |
| 13 |   if (prevn /= n)    // reset the mux selector on each new value of n |
| 14 |     for i in 0 to M-1 loop |
| 15 |       reg(i) <= i; |
| 16 |       if (i >= m) then |
| 17 |         reg(i) <= 0; |
| 18 |       end if; |
| 19 |     end loop; |
| 20 |   end if; |
| 21 |   //updated after every stage, perform permutation on the mux selector value |
| 22 |   if (input_address = n-1) |
| 23 |     reg(0) <= reg (m-1); // this will be overwritten if m is even |
| 24 |     for i in ((m-1)/2 - 1 downto 0) |
| 25 |       reg((i+1)*2 - 1 - 1* mplusone[0]) <= reg (m/2 -i*2); |
| 26 |       reg((i+1)*2 - 1* mplusone[0]) <= reg(m/2 -i*2 + 1); |
| 27 |     end loop; |
| 28 |   end if; |
| | |
| 29 | end if; |

FIG. 6

| Col. A Input Data (Out of Order) | Col. B Read & Write Addresses | Col. C Data in Memory 110-0 110-1 | Col. D Read & Write Addresses 110-2 | Col. E Data in Memory 110-0 110-1 | Col. F Read & Write Addresses | Col. G Data in Memory 110-2 110-1 |
|---|---|---|---|---|---|---|
| 0 | 000000 | 0 | 000000 | 0 | 000000 | 0 |
| 16 | 000001 | 16 | 010000 | 1 | 000001 | 16 |
| 32 | 000010 | 32 | 100000 | 2 | 000010 | 32 |
| 48 | 000011 | 48 | 110000 | 3 | 000011 | 48 |
| 4 | 000100 | 4 | 000100 | 4 | 000100 | 4 |
| 20 | 000101 | 20 | 010100 | 5 | 000101 | 20 |
| 36 | 000110 | 36 | 100100 | 6 | 000110 | 36 |
| 52 | 000111 | 52 | 110100 | 7 | 000111 | 52 |
| 8 | 001000 | 8 | 001000 | 8 | 001000 | 8 |
| 24 | 001001 | 24 | 011000 | 9 | 001001 | 24 |
| 40 | 001010 | 40 | 101000 | 10 | 001010 | 40 |
| 56 | 001011 | 56 | 111000 | 11 | 001011 | 56 |
| 12 | 001100 | 12 | 001100 | 12 | 001100 | 12 |
| 28 | 001101 | 28 | 011100 | 13 | 001101 | 28 |
| 44 | 001110 | 44 | 101100 | 14 | 001110 | 44 |
| 60 | 001111 | 60 | 111100 | 15 | 001111 | 60 |
| 1 | 010000 | 1 | 000001 | 16 | 010000 | 1 |
| 17 | 010001 | 17 | 010001 | 17 | 010001 | 17 |
| 33 | 010010 | 33 | 100001 | 18 | 010010 | 33 |
| 49 | 010011 | 49 | 110001 | 19 | 010011 | 49 |
| 5 | 010100 | 5 | 000101 | 20 | 010100 | 5 |
| 21 | 010101 | 21 | 010101 | 21 | 010101 | 21 |
| 37 | 010110 | 37 | 100101 | 22 | 010110 | 37 |
| 53 | 010111 | 53 | 110101 | 23 | 010111 | 53 |

| Col. A Cont'd | Col. B Cont'd | Col. C Cont'd | Col. D Cont'd | Col. E Cont'd | Col. F Cont'd | Col. G Cont'd |
|---|---|---|---|---|---|---|
| 9 | 011000 | 9 | 001001 | 24 | 011000 | 9 |
| 25 | 011001 | 25 | 011001 | 25 | 011001 | 25 |
| 41 | 011010 | 41 | 101001 | 26 | 011010 | 41 |
| 57 | 011011 | 57 | 111001 | 27 | 011011 | 57 |
| 13 | 011100 | 13 | 001101 | 28 | 011100 | 13 |
| 29 | 011101 | 29 | 011101 | 29 | 011101 | 29 |
| 45 | 011110 | 45 | 101101 | 30 | 011110 | 45 |
| 61 | 011111 | 61 | 111101 | 31 | 011111 | 61 |
| 2 | 100000 | 2 | 000010 | 32 | 100000 | 2 |
| 18 | 100001 | 18 | 010010 | 33 | 100001 | 18 |
| 34 | 100010 | 34 | 100010 | 34 | 100010 | 34 |
| 50 | 100011 | 50 | 110010 | 35 | 100011 | 50 |
| 6 | 100100 | 6 | 000110 | 36 | 100100 | 6 |
| 22 | 100101 | 22 | 010110 | 37 | 100101 | 22 |
| 38 | 100110 | 38 | 100110 | 38 | 100110 | 38 |
| 54 | 100111 | 54 | 110110 | 39 | 100111 | 54 |
| 10 | 101000 | 10 | 001010 | 40 | 101000 | 10 |
| 26 | 101001 | 26 | 011010 | 41 | 101001 | 26 |
| 42 | 101010 | 42 | 101010 | 42 | 101010 | 42 |
| 58 | 101011 | 58 | 111010 | 43 | 101011 | 58 |
| 14 | 101100 | 14 | 001110 | 44 | 101100 | 14 |
| 30 | 101101 | 30 | 011110 | 45 | 101101 | 30 |

| Col. A Cont'd | Col. B Cont'd | Col. C Cont'd | Col. D Cont'd | Col. E Cont'd | Col. F Cont'd | Col. G Cont'd |
|---|---|---|---|---|---|---|
| 46 | 101110 | 46 | 101110 | 46 | 101110 | 46 |
| 62 | 101111 | 62 | 111110 | 47 | 101111 | 62 |
| 3 | 110000 | 3 | 000011 | 48 | 110000 | 3 |
| 19 | 110001 | 19 | 010011 | 49 | 110001 | 19 |
| 35 | 110010 | 35 | 100011 | 50 | 110010 | 35 |
| 51 | 110011 | 51 | 110011 | 51 | 110011 | 51 |
| 7 | 110100 | 7 | 000111 | 52 | 110100 | 7 |
| 23 | 110101 | 23 | 010111 | 53 | 110101 | 23 |
| 39 | 110110 | 39 | 100111 | 54 | 110110 | 39 |
| 55 | 110111 | 55 | 110111 | 55 | 110111 | 55 |
| 11 | 111000 | 11 | 001011 | 56 | 111000 | 11 |
| 27 | 111001 | 27 | 011011 | 57 | 111001 | 27 |
| 43 | 111010 | 43 | 101011 | 58 | 111010 | 43 |
| 59 | 111011 | 59 | 111011 | 59 | 111011 | 59 |
| 15 | 111100 | 15 | 001111 | 60 | 111100 | 15 |
| 31 | 111101 | 31 | 011111 | 61 | 111101 | 31 |
| 47 | 111110 | 47 | 101111 | 62 | 111110 | 47 |
| 63 | 111111 | 63 | 111111 | 63 | 111111 | 63 |

FIG. 8C

METHODS AND APPARATUS FOR REORDERING DATA SIGNALS IN FAST FOURIER TRANSFORM SYSTEMS

BACKGROUND

This disclosure relates to systems (e.g., methods and/or apparatus) for performing fast Fourier transform ("FFT") operations and/or inverse fast Fourier transform ("IFFT") operations. For convenience herein (e.g., to simplify the discussion) the phrase fast Fourier transform and the acronym FFT will generally be used as generic terms for both fast Fourier transform (FFT) operations and inverse fast Fourier transform (IFFT) operations.

More specifically, this disclosure relates to FFT operations of the type sometimes known as "radix $4''2'''$ FFT." In the expression "$4''2'''$," the parameter (exponent) n is a positive integer greater than zero (i.e., n can have any positive integer value such as 1, 2, 3, 4, . . . ), and the parameter (exponent) m can have either the value 0 or the value 1. If m=0 in a particular case, then the expression "radix $4''2'''$" can be simplified to "radix $4'''$" (because $2^0=1$). On the other hand, if m has a value of one, then the "radix $4''2'''$ FFT" may sometimes be referred to as a "mixed radix FFT" or the like. Despite the possibility of simplifying "radix $4''2^0$)" to "radix $4''$," it will be understood that references to "radix $4''2'''$" herein generally include the "radix $4''2^0$" case, unless the "radix $4''2^0$" case is expressly excluded (e.g., by expressly referring to a "mixed radix $4''2'''$ FFT", by specifying that m has a value of 1, or the like).

As is well known to those skilled in this art, radix $4''2'''$ FFT operations may be characterized by including "butterfly" operations that are performed on four inputs per butterfly operation. This is distinct or different from radix $2''$ FFT operations, which typically employ only "butterfly" operations that are performed on only two inputs per butterfly operation.

By way of further preliminaries, it will be understood that throughout this disclosure all "information," "data," "samples," "inputs," "outputs," "values," "addresses," and/or the like that are referred to are represented by electrical signals that are processed by electronic circuitry. Thus references to "data," "samples," "inputs," "outputs," "values," "addresses," and/or the like herein will be understood to always mean "data signals," "sample signals," and/or the like, even through the word "signal" or "signals" may not be expressly stated in all instances. Similarly, it will be understood that the FFT operations disclosed or otherwise discussed herein are always performed in electronic circuitry, some illustrative embodiments of at least relevant portions of such electronic circuitry being shown and described later in this disclosure.

At least some techniques for performing radix $4''2'''$ FFT operations include a need for reordering data items that are part of the FFT operation. For example, there may be a need to reorder data items output by the FFT operation (e.g., frequency domain data signal items or time domain data signal items). A typical way to implement such data reordering is to use two memory banks, the memory banks being used alternately to store successive complete sets of the data items in the starting order, and the memory bank that is not currently accepting new data items being addressed to retrieve the previously stored data items in the desired final order. Requiring two memory banks for this purpose can consume a relatively large amount of memory, and it may also increase latency in (i.e., delay through) the FFT circuitry.

SUMMARY

In accordance with certain possible aspects of this disclosure, data signal items output by a radix $4''2'''$ fast Fourier transform ("FFT") operation (or inverse FFT ("IFFT") operation) may not be in the order desired for further use of those data items. For example, these data signal items may be output in a non-natural order rather than in a desired natural order. Memory circuitry (e.g., dual-port memory circuitry) may be used in conjunction with circuitry for addressing the memory circuitry with address signals that are reordered in a particular way for each successive set of N data signal items (where N is the length of the transform, which is equal to the numerical value given by $4''2'''$ (e.g., N=32 when n=2 and m=1)). This reordering of the address signals is such as to allow use of memory circuitry with fewer data item storage locations than would otherwise be required to reorder the data items from non-natural to natural order. In particular, the memory circuitry only needs to be able to store N data signal items at any one time, which is more efficient memory utilization than would otherwise be required. (Storage of at least 2N data signal items is typically required without the benefit of the present disclosure.)

Further features of the disclosure, its nature and various advantages, will be more apparent from the accompanying drawings and the following detailed description.

BRIEF DESCRIPTION OF THE DRAWINGS

FIG. 6 is an exemplary flow chart of logic operations that may be performed in one of the circuit elements in FIG. 5 in accordance with one embodiment of the present invention.

FIGS. 8A-8C are collectively an exemplary, simplified chart of various sets of data and address values in accordance with one embodiment of the present invention.

DETAIL DESCRIPTION

Figure 1:
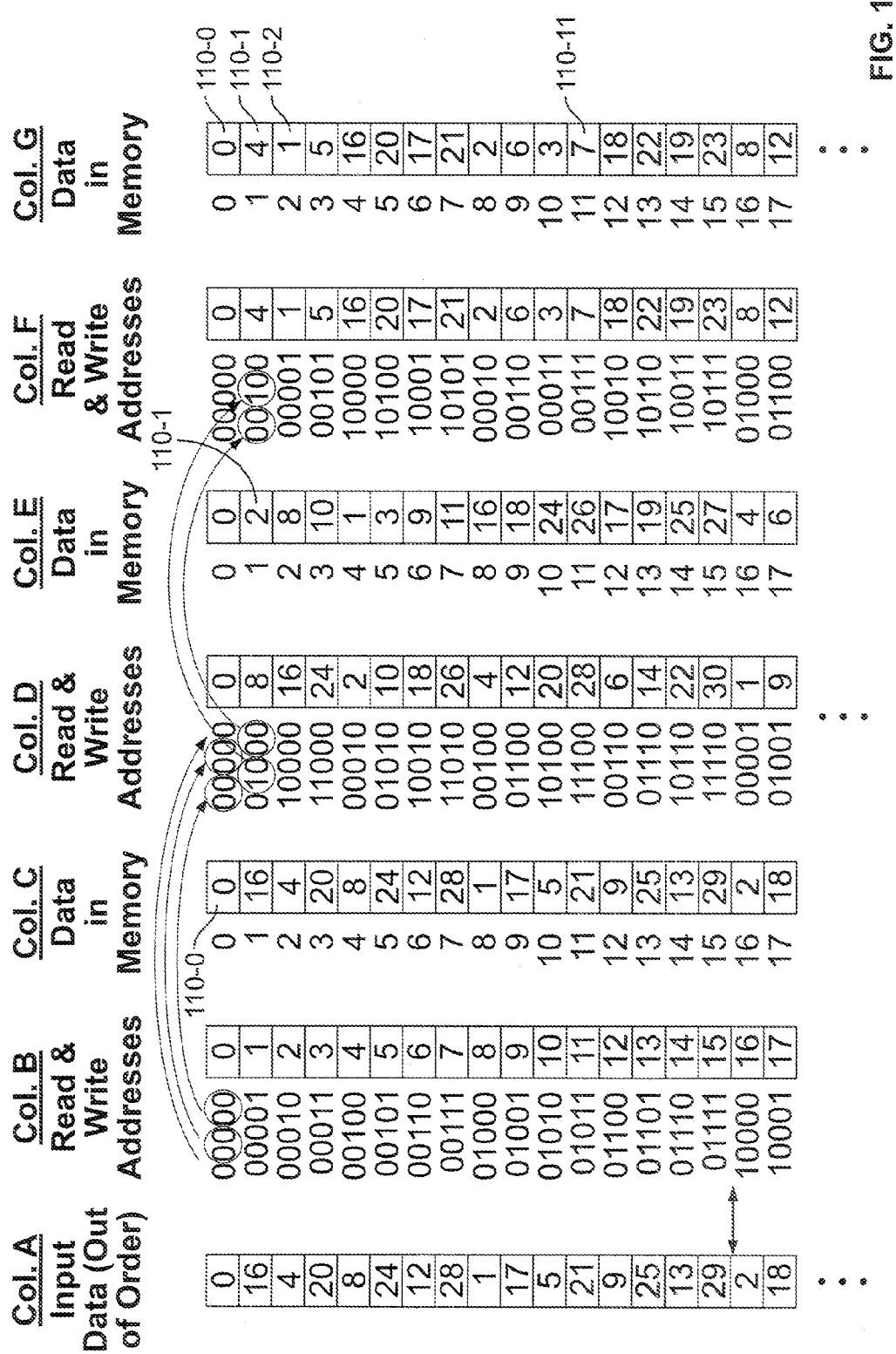
FIG. 1 is a simplified chart of various sets of data and address values in accordance with an illustrative embodiment of the present invention.
Figure 1:
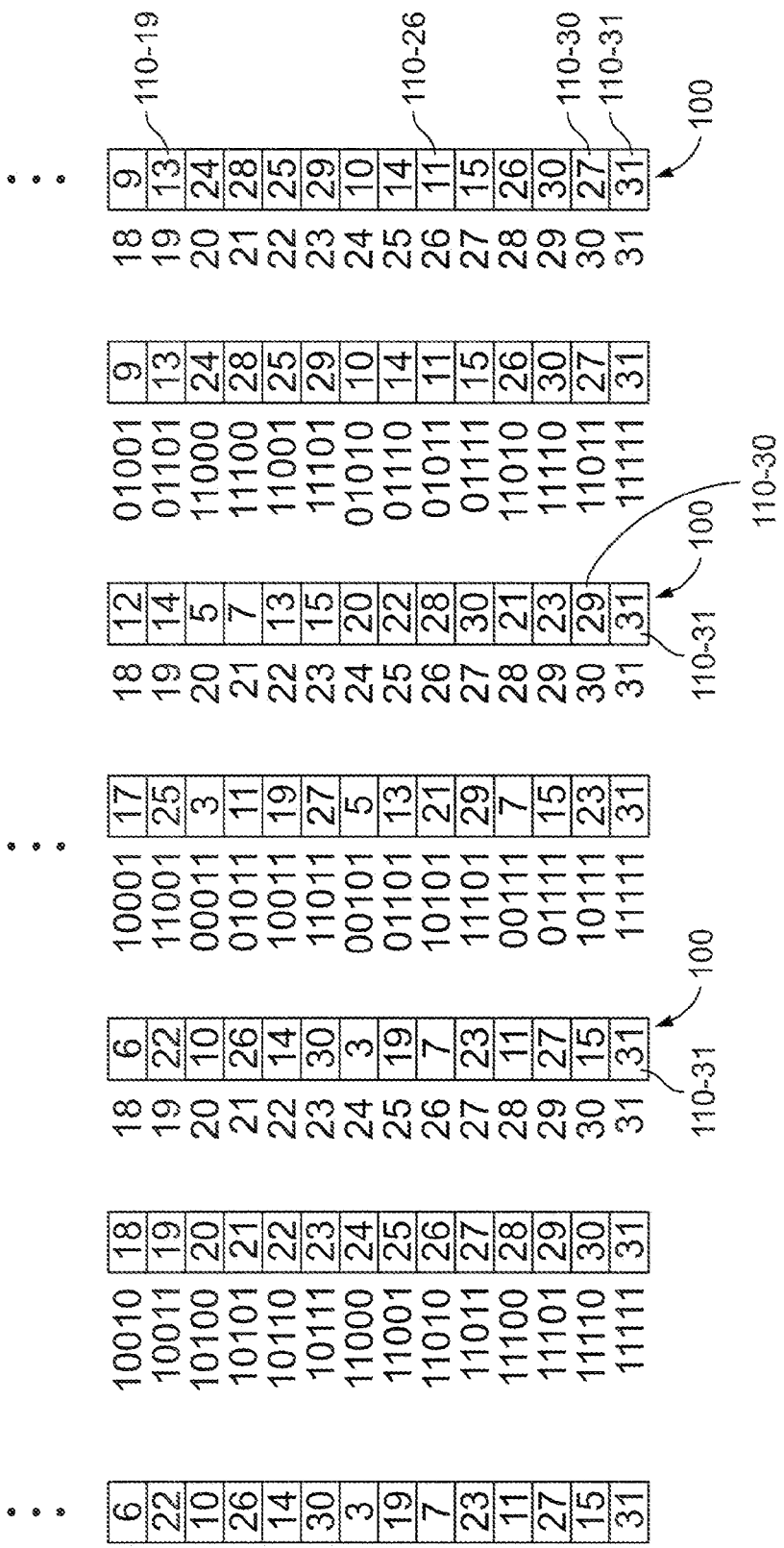

FIG. 1 shows an example of output processed data from a radix $4''2'''$ FFT operation in a case in which n is equal to 2 and m is equal to 1. Accordingly, there are N=$4^2 \times 2$=32 data items in each set of data items that the FFT outputs before beginning to output the next set of data items. In particular, column A in FIG. 1 shows (from the top of that column to the bottom) the "order" in which one complete set of data items appears at the output of the FFT operations that precede the output reordering provided by this disclosure. It will be appreciated that the FFT circuitry upstream from what is shown in column A outputs successive sets of such data items, always in the same order (i.e., the order shown from the top of column A to the bottom of that column).

Although the upstream FFT circuitry outputs each successive set of data items in the order from the top of column A to the bottom, that output order is not the desired final order of the data items. Rather, the desired final order of these items is shown by the numbers inside the boxes in column A. These numbers indicate that the desired final order of the data items in each set is as follows: (1) first, data item associated with top-most box in column A (i.e., the first data item output in a set); (2) second, data item associated with the ninth box from the top of column A (i.e., the ninth data item output in a set); (3) third, data item associated with the seventeenth box from the top of column A (i.e., the seventeenth data item output in a set); (4) fourth, data item associated with the twenty-fifth box from the top of column A (i.e., the twenty-fifth data item output in a set); and so on. For the avoidance of doubt, it is hereby expressly stated that the numbers in the boxes in column A are not the actual FFT output data values associated with those boxes, but only the desired final output order of those data items, e.g., after the data items have been reordered in accordance with this disclosure. When the data items have been thus reordered, (i.e., put in the order 0, 1, 2, 3, 4, 5, ..., N−1 based on the desired final order numbers shown in the boxes in column A), they may be referred to as being in their "natural order." In other words, another term for the above-mentioned desired final output order is natural order or the like. Thus an objective of this disclosure is to provide more efficient ways to reorder sets of data that FFT circuitry provides in a non-natural order (e.g., like that shown from the top of column A in FIG. 1 to the bottom) to the natural order (e.g., based on ordering the data items associated with the boxes in column A in accordance with the order numbers shown inside those boxes).

To state the foregoing in somewhat different terms, the numbers in the boxes in column A show the desired final order of the outputs in each set of outputs of the upstream FFT circuitry. In other words, it is desired for the FFT outputs in each set of such outputs to have the final order 0, 1, 2, 3, 4, 5, etc., based on the final order numbers in the boxes in column A. However, column A shows that the upstream FFT circuitry outputs the data items in a starting order (i.e., from the top of column A to the bottom) that is not the desired final order. Subsequent columns in FIG. 1 illustrate an embodiment of this disclosure whereby the out-of-order data items in column A can be output in the desired final order from a memory that has only N data item storage locations used for this purpose, where N is the number of data items in each set of data items output by the FFT circuitry (N is equal to 32 in the example shown in FIG. 1).

Column C in FIG. 1 shows memory circuitry 100 having N=32 data item storage locations 110-0, 110-1, 110-2, ..., 110-31. Memory 100 therefore has enough locations 110 to store all the data items forming one set of such items output by the FFT circuitry that is upstream from column A. In one embodiment, memory 100 is memory circuitry of the type for which any data item storage location 110 can be read from and written to in the same clock cycle. Dual-port memories are an example of this type of memory circuitry. A dual-port memory can receive a read and write address that identifies any one of its data item storage locations 110, and in one clock cycle the memory reads out (outputs) the data item value currently stored in that location and stores (writes) an applied new data item value into that location.

Column B shows an example of a set of read and write addresses for use by memory 100 during a particular phase of operation of the circuitry. In particular, column B shows read and write addresses that can be used during processing of one representative set of column A data values. On the left in column B is the address in binary notation of the memory 100 storage location 110 to which the horizontally adjacent or aligned column A FFT output data value will be written. (Reading from that memory 100 storage location also takes place at the same time, but consideration of such reading will be deferred in this discussion until the example is more fully developed below.) On the right in column B is the decimal equivalent of each horizontally adjacent binary address value. For example, if the column B address that is horizontally aligned with a column A data value is x, that column A data value will be written into the memory 100 location 110 having address x (i.e., location 110-$x$). In column C (and subsequent similar columns) the address of each memory 100 location 110 is indicated by the number outside but horizontally adjacent to that memory location.

During the time that the FFT circuitry outputs one particular set of data values one after another from the top of column A to the bottom, the read and write address values shown in column B are used in synchronism, one after another from the top of column B to the bottom, to control where in memory 100 each of these FFT output data values is written (stored). (For future reference, this set of FFT output values may sometimes be referred to (arbitrarily) as the "first" set of FFT output values or the like. Similarly, the set of addresses shown in column B may sometimes be referred to (arbitrarily) as the "first" set of address values or the like.) From the foregoing, it will be seen that use of the first set of address values (as in column B) to control writing of the first set of FFT output values (as in column A) into memory 100 results in that first set of FFT output values appearing in memory 100 as shown in column C. In other words, because the column B addresses are all in ascending order from 0 to 31, the first set of FFT output values is written into memory 100 as shown in column C in the same (column A) order that they were output by the upstream FFT circuitry. To take just a few specific examples of this, in the first horizontal line of information that crosses columns A, B, and C, the read and write address 0 in column B in that horizontal line causes the column A FFT output value having desired final order position 0 to be written into memory 100 address location 0 (or 110-0). As another example, the fifth horizontal line of information across columns A, B, and C includes column B address 4, which causes the column A FFT output having desired final order position 8 in column A to be written into memory 100 location 4 (or 110-4) as shown in column C.

Figure 2:
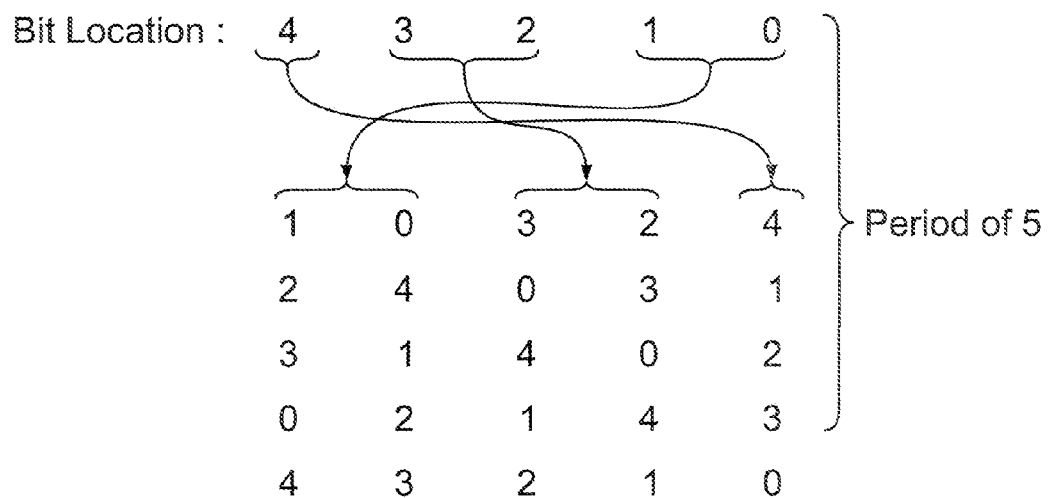
FIG. 2 is a simplified chart of address bit positions that may be used in the illustrative embodiment shown in FIG. 1.

After the first set of addresses shown in column B of FIG. 1 is used as described above to store the first set of FFT outputs (from column A) in memory 100 as shown in column C, the read and write addresses are changed from those shown in column B to a new ("second") set of addresses shown in column D. Column D is like column B in that the binary representation of each address is shown outside and to the left of the box containing the equivalent decimal representation of that address value. However, the order of the addresses in column D is different from the order of the addresses in column B. This reordering of the addresses from column B to column D can be produced by reordering the bits of each column B address in a certain way. In particular, to go from any column B address to the horizontally aligned column D address, the following procedure is used: (1) move the two right-most bits of the column B address to the two left-most bit positions in the column D address; (2) move the next two bits to the left in the column B address to the next two bit positions to the right in the column D address; and (3) move the left-most bit in the column B address to the right-most bit position in the column D address. (The first two lines in FIG. 2 show how the contents of the five bit positions 4 ... 0 of any address in column B in FIG. 1 are reordered to produce the horizontally aligned address in column D. The representative circles and arrows from column B to column D in FIG. 1 also show the above rule by which the column B address bits are reordered to produce the column D addresses.)

The reordered addresses shown in column D (i.e., the "second" set of addresses) are used to control processing of the second set of column A FFT outputs (as well as reading of the first set of FFT outputs from memory 100) as will now be described.

The upstream FFT circuitry outputs a second set of data values while the second set of addresses shown in column D is available for use. The starting order of this second set of FFT outputs is the same as the starting order of the first set of FFT outputs, and so column A again shows the starting order of the second set of outputs. Now, however, the read and write addresses for memory 100 are the second set of such addresses as shown in column D. As before, the address in column D that is horizontally aligned with each FFT output in column A is the memory 100 address into which that horizontally aligned FFT output is written. But it is also the memory 100 address from which previously stored FFT output data is read during the same clock cycle. Just as in the case of column B (described earlier in this specification), the addresses in column D are used one after another from the top of column D to the bottom. For example, the data item associated with the third box from the top of column A containing the second data set is written into the address binary 10000 (or decimal 16) of column D, as shown by the seventeenth box from the top of column E, as the data item associated with the seventeenth box from the top of column A containing the first data set that is stored in address 10000 (or 16) of column D is being read.

Returning (from the specific example mentioned at the end of the preceding paragraph) to the general discussion, column C shows the previously stored data that is read from each memory 100 address location, and column E shows the new data that is written into each address location during use of the column D addresses. Thus at the end of use of all of the addresses in column D, the entire first set of FFT output data values will have been read out from memory 100 and the entire second set of FFT output data values will have been written into memory 100 in place of the first set. Column E shows the contents of memory 100 after all of the column D addresses have been used. It is important to understand that columns C and E show the exact same 32 data storage locations in memory 100, except that column E indicates the contents of these memory locations at a later time than column C. In other words, columns C and E show the exact same memory circuitry but at different times. Only one bank of 32 memory locations 110-0 through 110-31 is required to perform the reordering of the first set of column A FFT outputs from the original column A order of those outputs to the final or "natural" order of those outputs (as read out from memory 100 using the addresses shown in column D). To ensure that the foregoing is completely clear, some specific examples will be covered in the next few paragraphs.

At the end of use of the addresses in column B, the first set of FFT outputs associated with column A has been stored in memory 100 as shown in column C. Then the next set of FFT outputs associated with column A begins to be output starting from the top of column A and proceeding down that column. At the same time, the reordered addresses in column D begin to be used to control reading from and writing to memory 100.

The column D addresses are also used starting from the top of column D and proceeding down that column, typically at the same rate as the second set of data items associated with column A is being output by the FFT circuitry upstream from column A. Thus, for example, when the first (top-most) address in column D is being used, the FFT output that is part of the second set of such outputs and that is associated with the top-most box in column A is available for writing into memory 100. The top-most address in column D (i.e., binary 00000 or decimal 0) is used to read from memory 100 location 0 the data item from the earlier (preceding) first set of FFT outputs that was previously stored in that location, and (in the same clock cycle) to write the second set FFT output associated with the top box in column A into that same memory 100 location 0. The top box in column C shows that the first data item from the first set that is thus read out from memory 100 has natural order number 0. The top box in column E shows that the first data item from the second set (which also has natural order number 0) is written into memory 100 location 110-0.

The next column D address that is used is the second address from the top of column D. This address has binary value 01000 or decimal value 8. Use of this address causes the contents of memory 100 location 110-8 to be read out. Column C shows that this is the first data set item having natural order 1. Therefore, after outputting the first set data item having natural order 0, memory 100 now outputs the first set data item having natural order 1. Thus it can already begin to be seen how this disclosure operates to reorder the FFT outputs from their non-natural column A order (0, 16, 4, 20, 8, ... ) to the natural order (0, 1, 2, 3, ... ) at the output of memory 100. In the same clock cycle that the first set data item having natural order 1 is read from memory location 110-8, the second set data item having natural order 16 is written into that memory location as shown in column E.

To follow one more example, the next column D address that is used is the third address from the top of column D. This address has binary value 10000 or decimal value 16. Use of this address causes the contents of memory 100 location 110-16 to be read out. Column C shows that this is the first data set item having natural order 2. Thus this continues the outputting from memory 100 of the first data set items in natural order (i.e., 0, 1, 2, 3, 4, ... ). In the same clock cycle that the first data set item having natural order 2 is read out from memory location 110-16, the second data set item having natural order 4 is written into that same memory location as shown in column E.

The process described in the preceding paragraphs continues until all of the addresses in column D have been used. When all of those column D addresses have been used, the entire first set of data items will have been output from memory 100 in natural order (i.e., 0, 1, 2, 3, 4, ... ), which is the desired "final" order of the data items. Also, the entire second set of data items will have been stored in memory 100 as shown in column E.

The next step is to again reorder the addresses for use in reading the second set of data items out from memory 100 and storing a third set of those items in memory 100 in place of the second set. The way to thus further reorder the addresses is shown by the representative arrows and circles from column D to column F. (The same approach is illustrated by the second and third lines in FIG. 2.) This technique is a repetition of the technique described above for reordering the bits of the each address in column B to produce the horizontally aligned address in column D. In particular, the right-most two bits of each address in column D become the left-most two bits of the horizontally aligned address in column F; the next-to-rightmost two bits of each address in column D become the next-to-left-most two bits of the horizontally aligned address in column F; and the left-most bit in each column D address becomes the right-most bit of the horizontally aligned address in column F.

The addresses in column F are used during reception of the third set of FFT data as shown in column A. Once again, the column F addresses are used one after another from the top of column F to the bottom. Each column F address is used to read a second set data item from the memory 100 location identified by that address, and (in the same clock cycle) to store in that same memory location the third set FFT data item associated with the horizontally aligned box in column A. The immediately above-mentioned reading is from memory contents having the order shown in column E. The immediately above-mentioned storing results in storage of the third set of FFT outputs in memory 100 in the order shown in column G. Considering just the first few of these operations, the first (top-most) address in column F (i.e., binary 00000 or decimal 0) causes the second set data item having order number 0 to be read out of memory 100 location 110-0 (see column E), and (in the same clock cycle) causes the third set data item having order number 0 to be stored in that same memory location (see column G). The next (next-to-top-most) address in column F (i.e., binary 00100 or decimal 4) causes the second set data item having order number 1 to be read out of memory 100 location 110-4 (see column E), and (in the same clock cycle) causes the third set data item having order number 16 to be stored in that same memory location (see column G). The third (third-from-top-most) address in column F (i.e., binary 00001 or decimal 1) causes the second set data item having order number 2 to be read out of memory 100 location 110-1 (see column E), and (in the same clock cycle) causes the third set data item having order number 4 to be stored in that same memory location (see column G). Again, these initial examples show the second set of data items being read out of memory 100 in natural order (i.e., 0, 1, 2, 3, 4, . . . ), and storage of the third set of data items in memory in preparation for subsequent reading out. That subsequent reading out will be in accordance with yet another reordering of the bits of the read and write addresses (which can again be similar to the above described address bit reordering, and which can be as shown in the third and fourth lines of FIG. 2). Moreover that subsequent reading of the third set of data will again put that third set of data in natural order (i.e., 0, 1, 2, 3, 4, . . . ).

Figure 3:
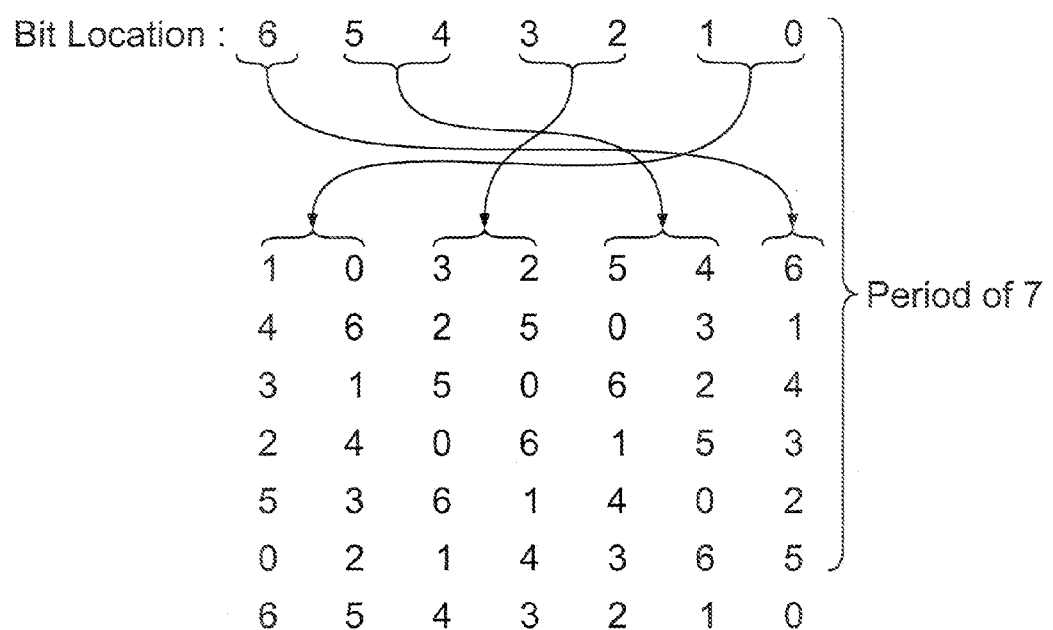
FIG. 3 is similar to FIG. 2 for another illustrative embodiment in accordance with certain possible aspects of the disclosure.

The above-described process can continue indefinitely. In each repetition of the basic cycle of the operations described above, one complete set of FFT outputs associated with column A is read out of memory 100 in natural order, and the next succeeding set of FFT outputs is stored in memory 100 in preparation for subsequent reading out (again in natural order) during the next cycle of the above operations. For subsequent sets of N data items, the same N memory 100 locations can be used over and over again. There is no need for memory 100 to have any more than N storage locations. Thus all of columns C, E, and G in FIG. 1 show the exact same 32 memory locations, but each of these columns shows the contents of those locations at a different time. The set of read and write addresses used for processing each temporally adjacent pair of sets of data items changes each time the processing of a new data item set is about to begin. However, these sets of addresses repeat either (a) with a period of $\log_2$ (N) if $\log_2$ (N) has an odd integer value like 5, 7, 9, etc., or (b) with a period of 2 if $\log_2$ (N) has an even integer value like 4, 6, 8, 10, etc. FIGS. 1 and 2 illustrate this for the case in which $N=4^2 2^1=32$ and $\log_2$ (N) is therefore 5. FIG. 3 shows extrapolation of the foregoing to a larger transform size in which $N=4^3 2^1=128$ and $\log_2$ (N) is therefore equal to 7. Later in this specification it will be shown that in all cases in which m=0 in the expression "radix $4''2'''$ FFT," the sets of different addresses that are needed repeat with a period of 2. Whatever value N has, the radix $4''2'''$ FFT has that many (i.e., N) outputs, and a memory (e.g., a dual-port memory) having only N memory locations can be used to reorder those outputs to their natural order (i.e., 0, 1, 2, 3, 4, . . . ) in accordance with this disclosure.

FIGS. 2-3 can be used as a basis for somewhat generalizing the discussion of how the bits of the read and write addresses are reordered for processing each successive set of FFT outputs in all cases in which $\log_2$ (N) is odd (because m=1 in the expression "radix $4''2'''$ FFT"). In all such cases (and for each address in any set of addresses in such cases), the right-most pair of bits in each starting address becomes the left-most pair of bits in the associated reordered address. The next-to-right-most pair of bits in the starting address becomes the next-to-left-most pair of bits in the associated reordered address. This right-to-left reversal of pairs of bits continues until the remaining left-most single bit in the starting address becomes the right-most bit in the reordered address. Note that the order of the bits in each of the above-mentioned pairs of adjacent bits is not changed as a result of reordering the bit pairs.

Figure 9:
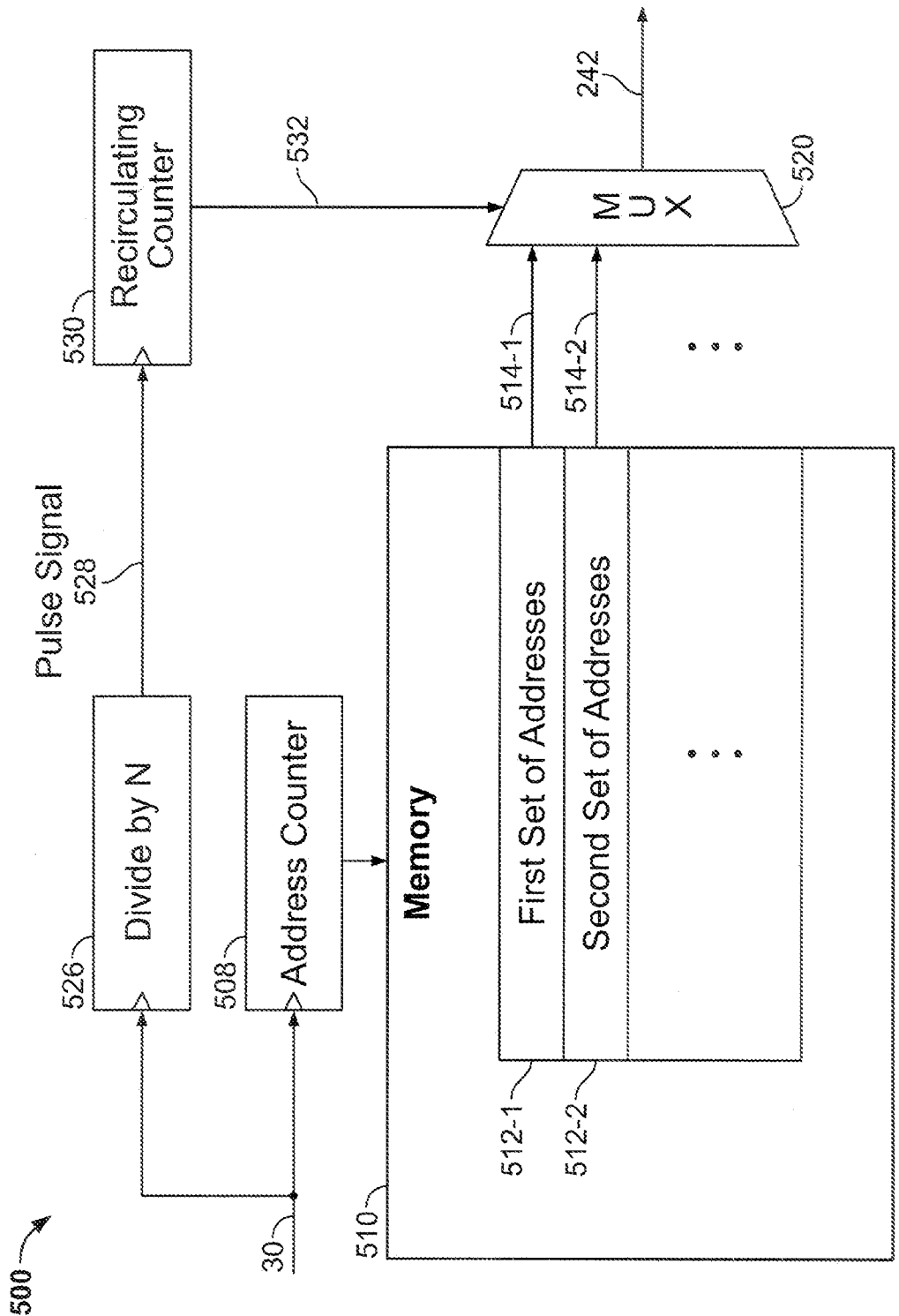
FIG. 9 is an exemplary, simplified, schematic block diagram of circuitry in accordance with one embodiment of the present invention.

The above-described reordering of read and write address bits can be performed in any of a number of ways. One way to do this is to store all of the required sets of addresses in a memory or look-up table and step through retrieval of the various address sets one after another as needed for processing successive sets of FFT outputs. Illustrative circuitry for use in this type of embodiment is shown in FIG. 9 and additionally described later in this specification.

Figure 4:
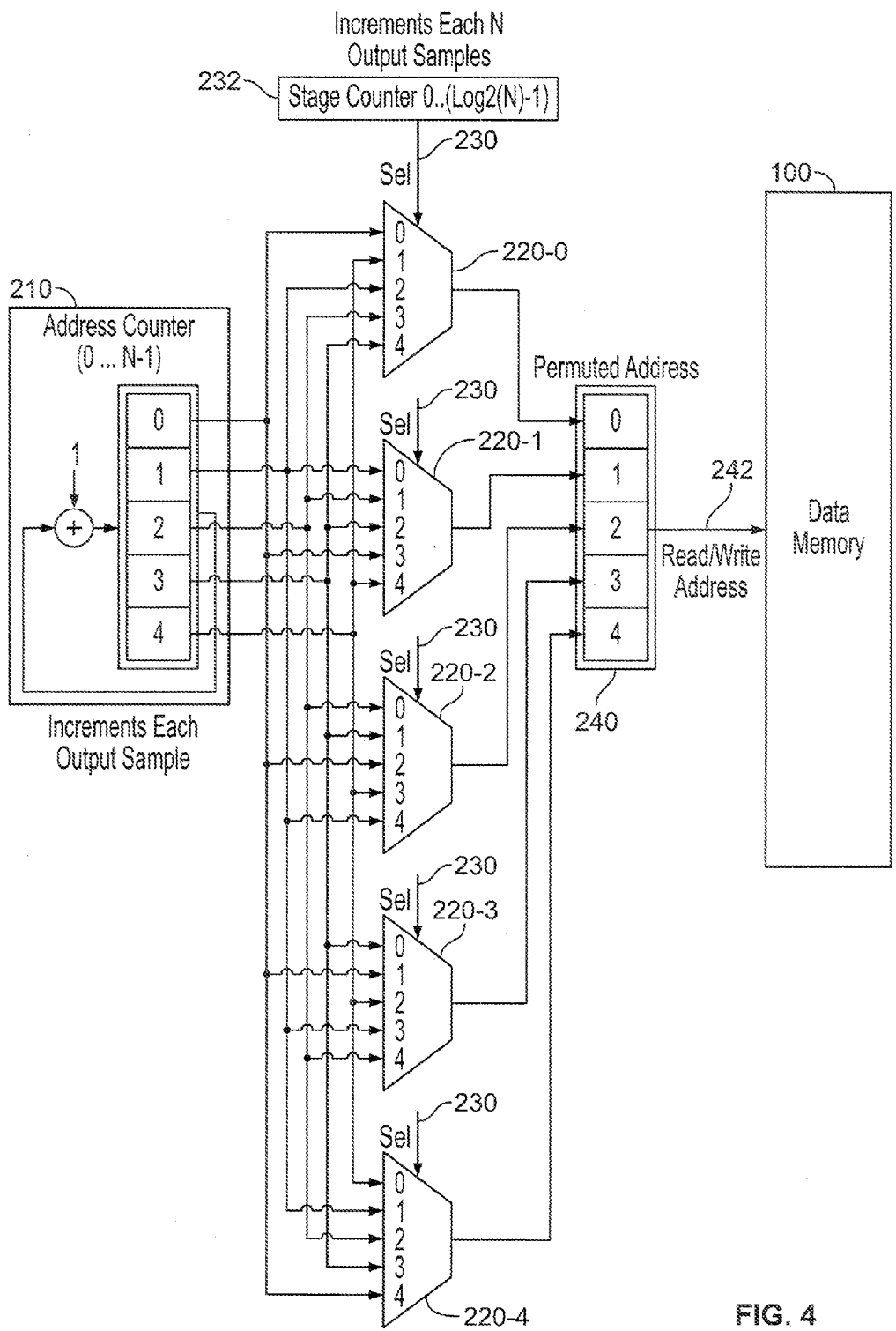
FIG. 4 is an exemplary, simplified, schematic block diagram of circuitry for providing address bit permutation of the type shown in FIG. 2 in accordance with one embodiment of the present invention.

FIG. 4 shows another way of providing read and write addresses having the bit sequences needed in accordance with this invention. In FIG. 4, element 210 is a binary counter that counts up from 0 to N−1, and then starts again to count up from 0. Counter 210 produces a new output value each time an address is required for processing a new FFT output. Counter 210 completes its preceding counting cycle and begins counting again from 0 each time a new set of FFT outputs needs to be processed. (In the example shown in FIG. 4, N is again 32 (as in FIGS. 1 and 2); but it will be understood that circuitry of the type shown in FIG. 4 can be constructed for any value of $N=4''2'''$, where m is equal to 1. Again, cases in which m=0 will be further dealt with later in this specification.)

The output of each stage of counter 210 is connected to a respective one of the selectable inputs of each of multiplexers 220-0 through 220-4. (There are five multiplexers 220 in this embodiment because $\log_2$ (N)=5 when N=32.) Each multiplexer 220 can select the signal on any one of its input leads to be its output signal, depending on the logical states of selection control signals 230 that are applied to all of the multiplexers. Selection control signals 230 have five possible states, each such state corresponding to a respective one of five permutations of the counter 210 outputs needed to provide read and write addresses for processing a particular set of FFT outputs. For the particular example being discussed, each of these selection control signal states can correspond to a respective one of the first five lines in FIG. 2. Assuming that all of multiplexers 220 select their top-most selectable inputs in response to selection control 230 state 0, that all of multiplexers 220 select their next-to-top-most selectable inputs in response to selection control 230 state 1, and so on down to multiplexers 220 all selecting their bottom-most selectable inputs in response to selection control 230 state 4, then the outputs of various stages of counter 210 may be connected to the multiplexer ("mux") inputs as follows: Counter stage 0 is connected to mux 220-0 input 0 (numbering the inputs of each mux from top to bottom), mux 220-1 input 3, mux 220-2 input 2, mux 220-3 input 1, and mux 220-4 input 4. Counter stage 1 is connected to mux 220-0 input 2, mux 220-1 input 0, mux 220-2 input 4, mux 220-3 input 3, and mux 220-4 input 1. Counter stage 2 is connected to mux 220-0 input 3, mux 220-1 input 1, mux 220-2 input 0, mux 220-3 input 4, and mux 220-4 input 2. Counter stage 3 is connected to mux 220-0 input 4, mux 220-1 input 2, mux 220-2 input 1, mux 220-3 input 0, and mux 220-4 input 3. Counter stage 4 is connected to mux 220-0 input 1, mux 220-1 input 4, mux 220-2 input 3, mux 220-3 input 2, and mux 220-4 input 0. This connectivity can be derived in a straight-forward manner from FIG. 2.

The result of the above connectivity is that when selection control 230 has state 0, the outputs of counter 210 stages 0-4 are respectively applied to stages 0-4 of permuted address register 240 in FIG. 4 (i.e., without any permutation of the counter bits to produce the succession of read and write addresses 242 in (and output by) register 240). This is analogous to what is shown in column B in FIG. 1 and the top line in FIG. 2. However, when selection control 230 has state 1, the above-described connectivity causes the counter 210 outputs to be permuted for application to (and output by) register 240. This permutation corresponds to what is shown in column D in FIG. 1 and the second line in FIG. 2. When selection control 230 has state 2, the permutation of the outputs of counter 210 as applied to (and output by) permuted read and write address register 240 corresponds to what is shown in column F of FIG. 1 and the third row in FIG. 2. The effects of selection control 230 states 3 and 4 will be apparent by extrapolation from the foregoing. Data memory 100 in FIG. 4 can be the same as the similarly numbered element in FIG. 1, and register 240 holds the read and write address 242 that is used for selecting (i.e., addressing) the memory 100 location from which data is read and to which new data is written during any given clock cycle of the circuitry. (As before, such "new data" comes from the FFT circuitry upstream from what is shown in column A in FIG. 1). Address counter 210 increments each time a new FFT data item is output by the upstream FFT circuitry. Address counter 210 reaches its maximum count value when the last FFT data item in any given set of such data items is output by the upstream FFT circuitry. Thereafter, counter 210 resets to 0 to prepare for counting through the next set of FFT data items to be output by the upstream FFT circuitry. Selection control signals 230 can come from a recirculating counter 232 that counts repeatedly from 0 to $\log_2 (N)-1$ (e.g., from 0 to 4 in the illustrative embodiment shown in FIG. 4). Counter 232 increments each time the next set of FFT data items is about to be output by the upstream FFT circuitry. Thus counter 210 increments each time a new FFT data item is output; but counter 232 holds a constant value throughout the outputting of each set of FFT data items, and only increments when the next set of such data items is about to be output.

Figure 5:
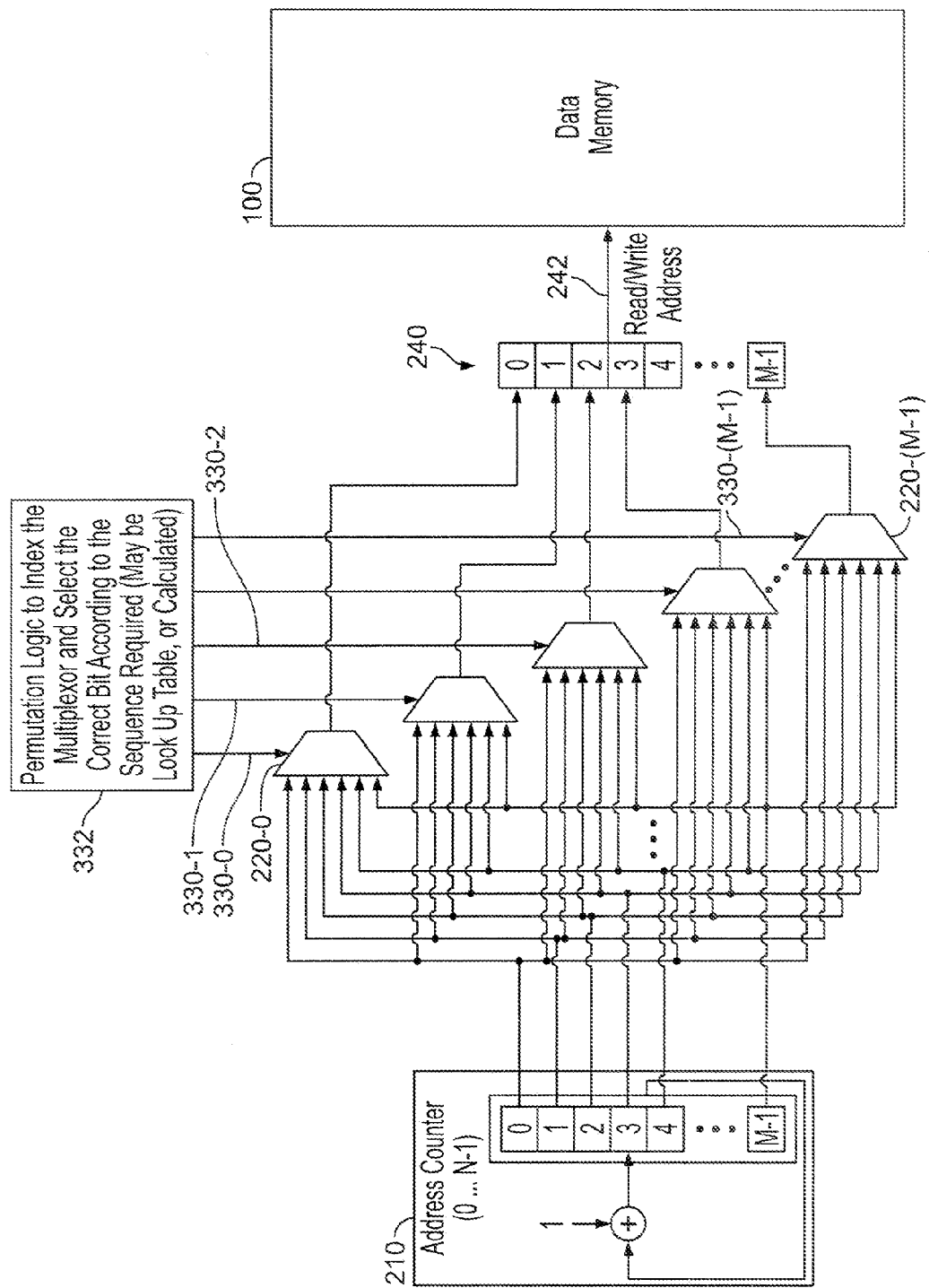
FIG. 5 is an exemplary, simplified, schematic block diagram of an alternative illustrative embodiment of circuitry of the general type shown in FIG. 4 in accordance with one embodiment of the present invention.

FIG. 5 shows an alternative embodiment of circuitry for producing permuted read and write addresses in register 240 from the outputs of counter 210. FIG. 5 thus shows an alternative to what is shown in FIG. 4. FIG. 5 is also somewhat generalized from FIG. 4 by being applicable to any value of N that is characteristic of a radix $4^n 2^m$ FFT operation, where m is either 0 or 1. In FIG. 5 the parameter M is equal to $\log_2 (N)$.

In FIG. 5, the output of each stage of counter 210 is applied to a corresponding selectable input to each mux 220. Thus for example, the output of counter 210 stage 0 is applied to the "0" selectable input to each mux 220, the output of counter 210 stage 1 is applied to the "1" selectable input to each mux 220, and so on. Permutation logic 332 produces a different set of selection control signals 330-1 through 330-(M−1) for controlling the selection made by each respective one of multiplexers 220-0 through 220-(M−1). These selection control signals 330 are such that the outputs of counter 210 are properly permuted as applied to (and output by) register 240 for use as successive read and write addresses 242 applied to memory 100 during each successive set of outputs from the FFT circuitry upstream from column A in FIG. 1. As in the case of circuit element 232 in FIG. 4, all of the sets of outputs 330 of circuitry 332 are constant during outputting of each set of FFT outputs. However, all of the sets of outputs 330 of circuitry 332 change each time a new set of FFT outputs is about to be produced. Again, the control signals 330 that are appropriate for each FIG. 5 mux 220 at any given time can be derived from what is shown in the horizontal line in FIG. 2, FIG. 3, or the like that is operative at that time. It is expressly noted that in FIG. 4 there is only one set of control signals 230 that is applied to all of muxes 220; but in FIG. 5 there are M−1 different sets of control signals 330, each of which control signal sets is applied to a respective one of muxes 220-0 through 220-(M−1).

FIG. 6 shows an example of a logic flow or pseudo-HDL (hardware description language) code that can be used to determine the contents of M registers (reg(0) through reg(M−1)) in circuitry 332, each of which registers provides selection control signals 330 for a respective one of M multiplexers 220 in circuitry like that shown in FIG. 5. Consistent with FIG. 5, FIG. 6 has been made generic to supporting any size transform up to and including a maximum transform size N (i.e., a maximum transform size that has N data items in each set of data items produced by the transform). FIG. 6 has also been made generic to radix $4^n 2^m$ FFTs in which the value of m is either 0 or 1, and in which the required sets of addresses permuted in accordance with this disclosure repeat with either a period of 2 (because m=0, e.g., as in FIGS. 8A-8C) or a period that is equal to $\log_2$ of the number of data items in each data item set produced by the FFT (because m=1, e.g., as in FIGS. 1-3). It should also be noted that the variables like N, M, n, and m used in FIG. 6 do not necessarily have the same meanings as the variables identified by those same letters elsewhere in this disclosure. The meanings of these variables in the context of FIG. 6 is provided in the following further discussion of that FIG.

The FIG. 6 logic can be implemented in any of a variety of ways. For example, it can be implemented in associated circuitry such as a field-programmable gate array ("FPGA") or an application-specific integrated circuit ("ASIC"). Alternatively, it can be implemented in a processor. The processor could be required to calculate the register values for the select bits 330 every N cycles. As another possibility, the processor could implement the algorithm in its entirety to calculate the read/write addresses. As still another possibility, a multi-processor system could be used in which one processor (e.g., a digital signal processing ("DSP") or general processor) performs the FFT algorithm and another processor calculates the addresses and stores them (or calculates the bit reordering pattern for the addresses combined with logic to generate and manipulate the addresses according to the generated pattern).

In the pseudo-HDL code of FIG. 6 the following notation is used: N is the maximum transform size that the logic and the associated circuitry can support; n is the size of the transform currently being implemented; M is $\log_2 (N)$; m is $\log_2 (n)$; and mplusone is m+1. Lines 1-6, 12, and 21 in FIG. 6 are "comment" or explanation lines. The right-hand portions of lines 13 and 23 also contain comment/explanation information.

Line 7 in FIG. 6 is performed when the circuitry is reset. Lines 8-10 are then performed to initialize the contents of each of the M registers to values 0 through M−1, respectively. Line 13 repeatedly tests if a new value of n is detected; and if it is, then the registers 0 to m−1 are set to values 0 to m−1, respectively, and the registers m to M−1 are set to 0. Line 22 then repeatedly tests whether the input_address from counter 210 is equal to n−1. When that line 22 "if" condition is satisfied, then the lines following the "if" line are performed as described below.

Line 23 in FIG. 6 causes the one address bit that is not part of the earlier-described pairs of adjacent bits to be permuted from the left-most bit position in the former address bit permutation to the right-most bit position in the next address bit permutation. If m is even (e.g., as in embodiments like those typified by FIGS. 8A-8C), this will be overwritten by the value determined by the subsequent lines of code. Lines 24-26 cause the earlier-described reordering of the pairs of adjacent address bits (i.e., from the former permutation of those pairs to the next permutation of those pairs). In particular, each of lines 25 and 26 permutes a respective one of the two bits associated with each pair. These two lines are performed repeatedly with incrementally decreasing value of integer index value i, starting from i=(m−1)/2 and decreasing by 1 for each repetition until the final repetition is performed when i=1. Index parameter i thus steps through as many values as there are pairs of adjacent bits to be reordered. Each value of i moves a respective one of the pairs of bits to its new position in the next permutation of the pairs. Just as FIG. 5 is generally applicable to any value of $N=4^n 2^m$ (where m is equal to 0 or 1), the flow of FIG. 6 can be used by element 332 in FIG. 5 for any such value of N.

Figure 7:
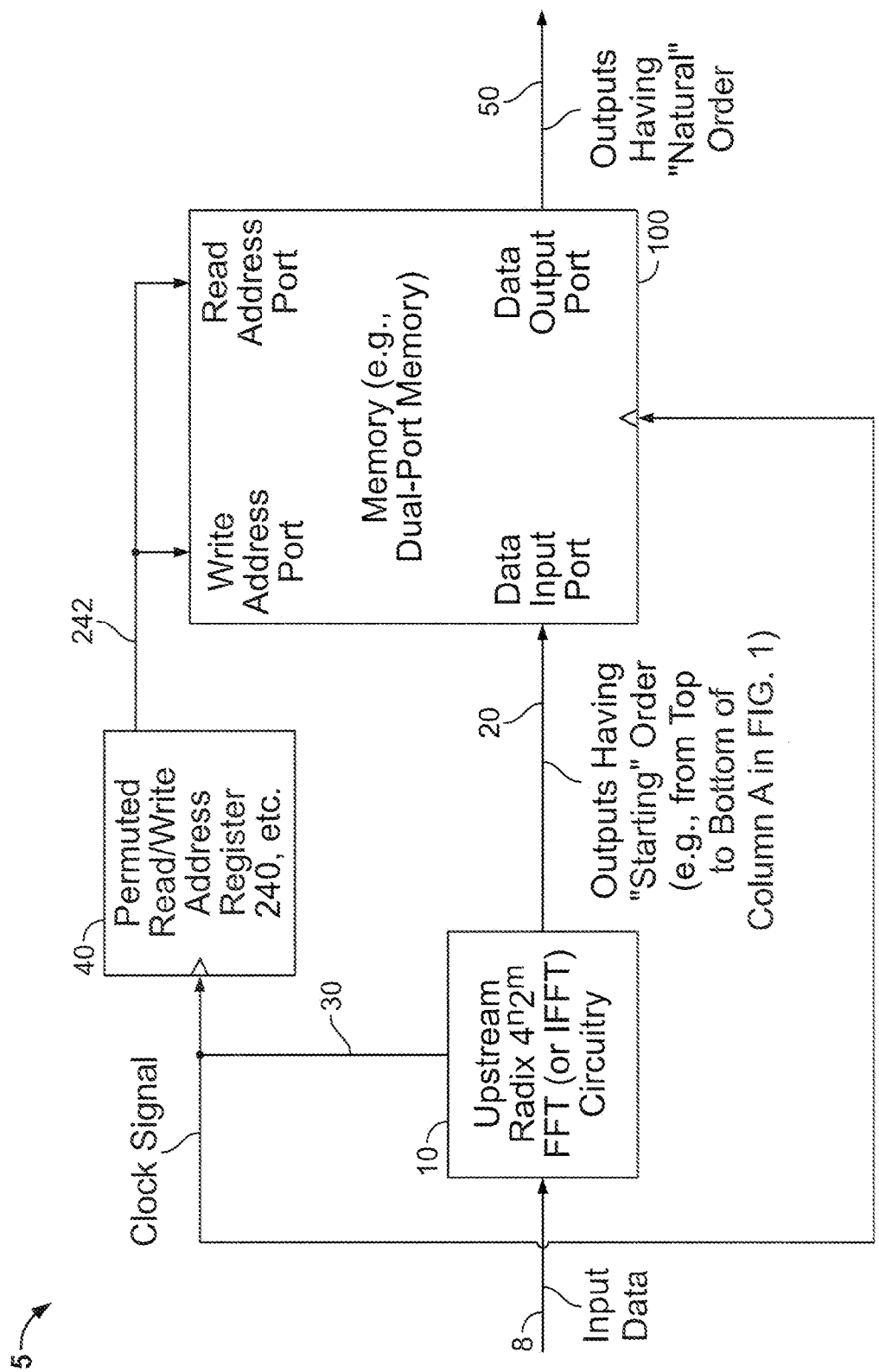
FIG. 7 is an exemplary, simplified, schematic block diagram of further circuitry in accordance with one embodiment of the present invention.

FIG. 7 shows an illustrative embodiment of system circuitry 5 in accordance with this disclosure. (The reference numbers like 5, 8, 10, 20, etc. that are used for circuit elements in FIG. 7 are not to be confused with data item order numbers like 0, 1, 2, 3, 4, 5, etc. or addresses like 0, 1, 2, 3, 4, 5, etc. that are used in FIG. 1, or bit position numbers like 0, 1, 2, 3, 4, etc. that are used in FIGS. 2 and 3.) In FIG. 7 circuitry 10 is the FFT (or IFFT) circuitry that is referred to elsewhere herein as upstream from what is represented by column A in FIG. 1. Circuitry 10 performs the desired radix $4^n 2^m$ FFT (or IFFT) operation on input data signals 8. Circuitry 10 provides the FFT (or IFFT) outputs 20 that are shown in column A of FIG. 1 in the order that is shown from the top of column A to the bottom of that column. Each of these outputs 20 is applied to the data input port of memory (e.g., dual-port memory) 100 as that output 20 is provided by circuitry 10. Circuitry 10 may also provide a clock (or clock-type) signal 30 to the circuitry 40 that provides permuted read and write address signals 242 for use by memory 100 as described earlier in this specification. For example, clock signal 30 may include a clock pulse each time circuitry 10 is outputting a new FFT output data item 20. Accordingly, circuitry 40 outputs a new read and write address 242 each time a new FFT data item 20 is being output by circuitry 10, and the bits of these addresses are permuted differently at the start of each new set of N such FFT output data items. Reading successive, previously stored data items 50 from memory 100 and writing successive new data items 20 to memory 100 may also be synchronized with operation of circuit elements 10 and 40 by application of clock signal 30 to memory 100.

The read and write address signals 242 provided by circuitry 40 are applied to both the write address port and the read address port of memory 100. This causes each new FFT output data item 20 to be stored in the storage location in memory 100 from which the FFT output data item 50 from the immediately preceding set of such data items has just been read via the data output port of the memory. The permutation of the read and write addresses is such that each set of data items is read from memory 100 in the desired, final, natural order, even though circuitry 10 always outputs the data items in a non-natural starting order that is different from the natural order. This is all as described earlier in this specification.

As has already been mentioned, in cases in which m is 0 in the relationship $N=4^n 2^m$, the value of N is given by the simpler relationship $N=4^n$. Note that in such cases $\log_2(N)$ is always an even integer number. This even integer is the number of bit positions required in read/write memory addresses for writing and subsequently reading each set of the N data items to or from memory 100. In such cases the required permutation of the addresses from one set of N data items to the next is somewhat simpler than when $\log_2(N)$ has an odd integer value (as in embodiments like those illustrated by FIGS. 1-3), and in addition such permutation always repeats with a period of 2. This principle is illustrated by FIGS. 8A-8C, which will now be described.

Figure 8B:
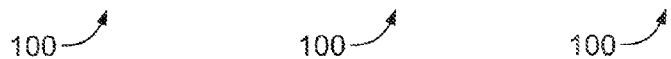

Column A in FIGS. 8A-8C shows the order (from the top of that column to the bottom) in which each set of $N=4^3=64$ data items is output from a radix $4^3$ FFT operation. Column B in FIGS. 8A-8C shows a "first" set of read/write addresses that can be used for writing a "first" set of such N data items in N locations in memory 100. Column C in FIGS. 8A-8C thus shows the result of writing the "first" set of (column A) data items into memory 100 using the "first" set of (column B) addresses.

Column D in FIGS. 8A-8C shows a "second" set of read/write addresses that can be used for reading the "first" set of data items (column C) from memory 100 and writing a "second" set of column A data items into memory 100 as each "first" set data item is read from the memory. Note that each address in column D is permuted as compared to the horizontally aligned address in column B. In particular, this permutation is as follows: (1) the left-most pair of column B bits becomes the right-most pair of column D bits; (2) the middle pair of column B bits becomes the middle pair of column D bits; and (3) the right-most pair of column B bits becomes the left-most pair of column D bits. The result of using the column D addresses (one after another from the top of column D to the bottom of that column) to read the "first" set of data items (column C) out of memory 100 is to read the "first" set of data items out in natural order. In particular, the top-most address in column D causes data item 0 (column C) to be read out; then the next-to-top-most address in column D causes data item 1 (column C) to be read out; and so on so that further column C data items are read out in the natural order 2, 3, 4, 5, . . . .

As each column C data item is thus read out, the horizontally aligned one of the "second" set of data items (column A) is stored in the memory 100 location from which reading just took place. In other words, this results in using the column D addresses, one after another from the top of column D to the bottom of that column, to write the horizontally aligned "second" data items (column A) into memory 100 as shown in column E. Thus column E shows how the "second" set of (column A) data items is stored in memory 100 when all of the "second" set of data items have been received. Note that the "second" set of data items is in natural order from the top of column E to the bottom of that column.

The next step is to use the column F addresses (from the top of that column to the bottom) (1) to read out the horizontally aligned "second" set of (column E) data items, and (2) to store the horizontally aligned "third" set of (column A) data items. Note that the column F addresses are permuted relative to the column D addresses in exactly the same way that the column D addresses are permuted relative to the column B addresses.

Note further that this results in the column F addresses being identical to the column B addresses. In other words, in cases of this kind, permutation of the addresses repeats with a period of 2. The column F addresses are in binary order from the top of column F to the bottom. Use of the column F addresses in that order causes the "second" set of data items (column E), which are already in natural order in memory 100, to be read out in natural order (i.e., in the order 0, 1, 2, 3, 4, etc.). As the "second" set of data items is thus being read out, the "third" set of data items is stored in memory 100 as shown in column G. Note that the column G data item order is the same as the column C order. Thus data item order in memory 100 is repeating with a period of 2, just like the period-of-2 repetition of read/write address permutation.

The above-described process can continue indefinitely. For example, the next address column (to the right of data column G) will be identical to column D, and the next data column (still farther to the right of data column G) will be identical to column E.

As in the earlier-described embodiments, addresses with permutation of the type shown in FIGS. 8A-8C can be produced in any of a number of ways. For example, both sets of permuted addresses can be stored in a memory or look-up table, which can be accessed to output those sets alternately. As another example, circuitry like that shown in FIG. 4 can be used. In such an embodiment, each mux like 220 has two selectable inputs from two different ones of the outputs of address counter 210, and the selection control input 230 to each mux 220 merely toggles (alternates) between causing the mux to select (output) either its first or second selectable input. As still another example, addresses with permutation of the type shown in FIGS. 8A-8C can be produced by circuitry of the type shown in FIG. 5 with circuit element 332 constructed or operated as shown in FIG. 6.

It is again noted that all columns like columns C, E, G, etc. in FIGS. 8A-8C show the same N=64 memory 100 data item storage locations being reused over and over again for temporary storage of successive sets of the N data items. Thus (as in the case of all other embodiments such as what is illustrated by FIG. 1), whatever value N has in any embodiment (i.e., whatever the size of each successive set of data items), memory 100 only needs to be able to store N data items at any one time (i.e., the equivalent of one of the successive sets of data items). This is more efficient memory utilization than would otherwise be possible.

It has been mentioned that one way to produce the various sets of permuted addresses that are employed in accordance with this disclosure is to store all of the required sets of addresses in a memory or look-up table and step through retrieval of the various address sets one after another as needed for processing successive sets of FFT outputs. An illustrative embodiment of this type of memory or look-up table circuitry 500 is shown in FIG. 9. Thus circuitry 500 is another example of circuitry that can be used for element 40 in FIG. 7 or for similar purposes in other embodiments in accordance with this disclosure. FIG. 9 is further described in the next paragraphs.

As shown in FIG. 9, memory circuitry 500 includes a memory 510 in which each of the required sets of addresses is stored for retrieval via multiplexer ("mux") circuitry 520. For example, the "first set of addresses" 512-1 stored in memory 510 may be like the set of addresses shown in column B in FIG. 1 or in column B in FIGS. 8A-8C. The "second set of addresses" 512-2 stored in memory 510 may be like the set of addresses shown in column D in FIG. 1 or in column D in FIGS. 8A-8C. Further required sets of addresses (e.g., like the set shown in column F in FIG. 1) may be similarly stored in memory 510. On the other hand, the embodiment shown in FIGS. 8A-8C illustrates the point that in some cases only two sets of addresses may be needed. In any case, disclosure like FIGS. 2, 3, and 8A-8C establishes that the address sets always eventually repeat (e.g., with a period of 2 in FIGS. 8A-8C, with a period of 5 in FIG. 2, with a period of 7 in FIG. 3, etc.). Thus only a finite number of sets of addresses ever needs to be stored in memory 510, because the address sets that are thus stored will be used one after another in a repeating sequence or succession.

The addresses in each set of addresses 512 can be applied (one after another in succession) to a respective one of the selectable sets of inputs 514-1, 514-2, etc. to mux 520. Selection control signals 532 that are applied to the selection control inputs of mux 520 control which set of selectable inputs 514 mux 520 outputs via its output leads 242 (which can be the similarly numbered leads 242 in FIG. 7). Selection control signals 532 are produced by recirculating counter 530. A signal pulse 528 is applied to counter 530 each time that a new set of data items (e.g., as in column A in FIG. 1 or FIGS. 8A-8C) is about to begin being output by circuitry 10 (FIG. 7) on leads 20. Each such pulse 528 causes counter 530 to increment by one unit (e.g., from 0 to 1, from 1 to 2, etc.), or if counter 530 has previously reached the desired upper limit of its count, then to reset to 0. The "desired upper limit" of the count of counter 530 may be 1 in the case of embodiments like that illustrated by FIGS. 8A-8C, or it may be $\log_2(N)-1$ in the case of embodiments like that illustrated by FIGS. 1-3. When counter 530 is registering 0, the output 532 of the counter causes mux 520 to select and output (242) the first set of addresses 512-1. When counter 530 is registering 1, the output 532 of the counter causes mux 520 to select and output (242) the second set of addresses 512-2. Higher counts (if any) attained by counter 530 cause mux 520 to select and output (242) higher numbered ones (if any) of address sets 512. Resetting counter 530 causes it to recirculate back to the initial selection of address set 512-1, after which it begins to increment again.

It will be understood that while each set of addresses 512 is being selected as described above, the addresses in that set are output (514/242) one after another in succession. This may be accomplished, for example, by recirculating address counter circuitry 508, which increments in response to each pulse in clock signal 30 (FIG. 7), and which thereby selects for outputting (514/242) successive different ones of the addresses in any address set 512 currently being selected by mux 520. A pulse is provided in above-described signal 528 after every N cycles of clock signal 30. For example, divide by N circuitry 526 may be provided to divide clock signal 30 by N in order to produce pulse signal 528.

Although FIG. 9 shows mux 520 as a separate element outside of memory 510, it will be understood that the function of mux 520 can alternatively be performed by memory element addressing circuitry that is part of memory 510.

In some respects recapitulating and/or extending the foregoing, certain aspects of this disclosure relate to circuitry (e.g., 5) for reordering successive sets of data items (e.g., in a radix $4^n 2^m$ fast Fourier transform ("FFT") operation; one representative set of such data items being as shown in column A in FIG. 1 or in column A in FIGS. 8A-8C). Such circuitry (e.g., 5) may include circuitry (e.g., 40) for producing successive sets of addresses (e.g., as in columns B, D, and F in FIG. 1 or FIGS. 8A-8C) in synchronism with the successive sets of data items (e.g., as in column A). The order of pairs of adjacent bits in each address in each set of the addresses may be reversed as compared to the order of said pairs of adjacent bits in a corresponding address in an immediately preceding one of the sets of addresses. (As used herein, the phrase "the order of pairs of adjacent bits in each address in each successive set of the addresses being reversed as compared to the order of the pairs of adjacent bits in a corresponding address in an immediately preceding one of the sets of addresses" or similar phrasing refers to the type of address bit reordering that takes place on any horizontal line between column B and column D in FIG. 1 or FIGS. 8A-8C, or between column D and column F in FIG. 1 or FIGS. 8A-8C. This address bit reordering may also be of the type that takes place between any two adjacent lines in FIG. 2 or FIG. 3. It may include moving the left-most bit of each address in the preceding set of addresses to the right-most bit position of the corresponding address in the current set of addresses if the number of bits in each address is odd (e.g., as in FIG. 1). This is not necessary if the number of bits in each address is even (e.g., as in FIGS. 8A-8C).) The circuitry (e.g., 5) here being recapitulated may further include memory circuitry (e.g., 100), circuitry (e.g., 20) for applying each successive set of the data items to a data input port of the memory circuitry, and circuitry (e.g., 242) for applying each successive set of the addresses to read and write address ports of the memory circuitry so that the data items (e.g., 20) of each successive set of the data items are stored in the memory circuitry as previously stored data items (e.g., 50) are read out from a data output port of the memory circuitry.

The above-mentioned memory circuitry (e.g., 100) may be dual-port memory circuitry.

In circuitry (e.g., 5) as recapitulated above, the data items (e.g., items 0, 16, 4, 20, 8, etc. in column A in FIG. 1, or items 0, 16, 32, 48, etc. in column A in FIGS. 8A-8C) in each successive set of the data items may be produced one after another in succession.

In such circuitry (e.g., 5) the circuitry (e.g., 40) for producing the addresses (e.g., 242) in each successive set of the addresses may produce the addresses in each successive set of the addresses one after another in succession in synchronism with production of an associated one of the data items (e.g., clock signal 30 may provide such synchronism between successive data items 20 and successive addresses 242).

In such circuitry (e.g., 5) the circuitry (e.g., 20) for applying each successive set of data items to the data input port of the memory circuitry (e.g., 100) may apply each of the data items to the data input port in synchronism with production of that data item (e.g., clock signal 30 may provide such synchronism between successive data items 20 and clocking of memory 100).

In such circuitry (e.g., 5) the circuitry (e.g., 242) for applying each successive set of the addresses to the read and write address ports of the memory circuitry (e.g., 100) may apply each of the addresses in each set of the addresses to the read and write address ports of the memory circuitry in synchronism with application of the associated one of the data items (e.g., 20) to the data input port of the memory circuitry (e.g., clock signal 30 applied to both circuitry 40 and memory 100 may provide such synchronism).

In such circuitry (e.g., 5) the data items (e.g., 20) may be outputs of a radix $4''2'''$ FFT operation (e.g., 10) in non-natural order (e.g., the order 0, 16, 4, 20, 8, 24, etc. shown from the top to the bottom of column A in FIG. 1, or the order 0, 16, 32, 48, etc. shown from the top to the bottom of column A in FIGS. 8A-8C).

In such circuitry (e.g., 5) the addresses (e.g., 242) in each set of the addresses applied to the read and write address ports of the memory circuitry (e.g., 100) may cause the data items (e.g., 50) read from the data output port of the memory circuitry to be in natural order (e.g., 0, 1, 2, 3, 4, etc. as described earlier in this specification).

In such circuitry (e.g., 5) each of the successive sets of data items (e.g., 20 (shown as a set in column A in FIG. 1 or FIGS. 8A-8C)) may consist of a predetermined number N (e.g., 32 in FIG. 1 or 64 in FIGS. 8A-8C) of the data items. Only N of the data items may be stored in the memory circuitry at any one time (e.g., as in any of columns C, E, and G in FIG. 1 or FIGS. 8A-8C).

In such circuitry (e.g., 5) the circuitry (e.g., 40) for producing successive sets of addresses may include a memory (e.g., 510) for storing each of the sets of addresses (e.g., 512-1, 512-2, etc.), and circuitry (e.g., 520, 530) for retrieving each of the sets of addresses from the memory, one set after another, in a repeating succession.

Further recapitulating and/or extending the foregoing, certain other aspects of this disclosure relate to a method for reordering successive sets of data signal items (e.g., 20 (a representative set being shown in column A in FIG. 1 or FIGS. 8A-8C) in a radix $4''2'''$ fast Fourier transform ("FFT") operation). Such a method may include producing signals (e.g., 242) indicative of successive sets of addresses (e.g., the sets of addresses shown in any of columns B, D, and F in FIG. 1 or FIGS. 8A-8C) in synchronism with the successive sets of data signal (e.g., clock signal 30 may provide such synchronism). The order of the pairs of adjacent bits in each address in each set of the addresses may be reversed as compared to the order of said pairs of adjacent bits in a corresponding address in an immediately preceding one of the sets of addresses (e.g., column D in FIG. 1 or FIGS. 8A-8C shows how the order of pairs of bits are reversed as compared to column B in FIG. 1 or FIGS. 8A-8C). The method here being recapitulated may further include applying each successive set of the data signal items (e.g., 20) to a data input port of memory circuitry (e.g., 100). The method may still further include applying each successive set of the addresses (e.g., 242) to read and write address ports of the memory circuitry (e.g., 100) so that the data signal items of each successive set of the data signal items are stored in the memory circuitry as previously stored data signal items (e.g., 50) are read out from a data output port of the memory circuitry.

The above-mentioned memory circuitry (e.g., 100) may be dual-port memory circuitry.

In a method as recapitulated above, the data signal items (e.g., 20) in each successive set of the data signals items may be produced one after another (e.g., the data signal items in column A in FIG. 1 or FIGS. 8A-8C are produced one after another from the top of that column to the bottom).

In a method as recapitulated above, the producing may produce the addresses (e.g., 242) in each successive set of the addresses one after another in succession in synchronism with production of an associated one of the data signal items (e.g., the addresses in column B in FIG. 1 or FIGS. 8A-8C may be produced one after another in succession from the top of column B to the bottom in synchronism with production of the horizontally aligned data items in column A in FIG. 1 or FIGS. 8A-8C; clock signal 30 may provide the specified synchronism).

In a method as recapitulated above, the applying each successive set of the data signal items (e.g., 20) to the data input port of the memory circuitry (e.g., 100) may apply each of the data signal items to the data input port in synchronism with production of that data signal item (e.g., 20; clock signal 30 may provide the specified synchronism).

In a method as recapitulated above, the applying each successive set of the addresses (e.g., 242) to the read and write address ports of the memory circuitry (e.g., 100) may apply each of the addresses in each set of the addresses to the read and write address ports of the memory circuitry in synchronism with application of the associated one of the data signal items (e.g., 20) to the data input port of the memory circuitry (e.g., 100; clock signal 30 may provide the specified synchronism).

In a method as recapitulated above, the data signal items (e.g., 20) may be output of a radix $4^n2^m$ FFT operation in non-natural order (e.g., column A in FIG. 1 or FIGS. 8A-8C shows (from the top of that column to the bottom) the non-natural order 0, 16, 4, 20, 8, 24, etc., or 0, 16, 32, 48, 4, etc. of the data items output by circuitry 10).

In a method as recapitulated above, the addresses (e.g., 242) applied to the read and write address ports of the memory circuitry (e.g., 100) may cause the data signal items (e.g., 50) read from the data output port of the memory circuitry to be in natural order (e.g., the natural order 0, 1, 2, 3, 4, 5, etc., as described earlier in this specification).

In a method as recapitulated above, each of the successive sets of data signal items (e.g., 20) may consist of a predetermined number N (e.g., 32 in FIG. 1 or 64 in FIGS. 8A-8C) of the data signal items. In such a case, only N of the data signal items may be stored in the memory circuitry (e.g., 100) at any one time (e.g. column C in FIG. 1 shows only 32 data signal items stored in memory 100, and the same is true for each of columns E and G in FIG. 1; similarly, each of columns C, E, and G in FIGS. 8A-8C shows only 64 data items stored in memory 100 at any one time).

In a method as recapitulated above, the producing successive sets of addresses may include storing the sets of addresses (e.g., 512-1, 512-2, etc.) in a memory (e.g., 510), and retrieving each of the sets of addresses from the memory, one set after another, in a repeating succession (e.g., using elements 520 and 530).

Still further recapitulating and/or extending the foregoing, certain further aspects of this disclosure relate to circuitry (e.g., 5) for reordering data items (e.g., 20) in each successive set of N data items (e.g., column A in FIG. 1 shows one representative set of such data items in a case in which N=32; similarly, column A in FIGS. 8A-8C shows one representative set of such data items in a case in which N=64) output successively in non-natural order (column A in FIG. 1 shows the data items in non-natural order 0, 16, 4, 20, 8, 24, etc.; column A in FIGS. 8A-8C shows the data items in non-natural order 0, 16, 32, 48, 4, etc.) (e.g., from a radix $4^n2^m$ fast Fourier transform operation performed by circuitry 10). The circuitry (e.g., 5) here being recapitulated may include circuitry (e.g., 40) for producing successive sets of addresses (e.g., columns B, D, and F in FIG. 1 or FIGS. 8A-8C show examples of such successive sets) in synchronism with the successive sets of data items (e.g., clock signal 30 may provide the specified synchronism). The order of pairs of adjacent bits in each address in each set of the addresses may be reversed as compared to the order of said pairs of adjacent bits in a corresponding address in an immediately preceding one of the sets of addresses (e.g., column D in FIG. 1 or FIGS. 8A-8C shows an example of how the pairs of bits from each address in column B in FIG. 1 or FIGS. 8A-8C are reversed in order to produce the corresponding new address in column D; each successive line in FIG. 2 or FIG. 3 also shows examples of how the pairs of address bits in the preceding line may be reversed (or reordered or permuted) in order to produce the address bit order in the first-mentioned ("successive") line). The circuitry (e.g., 5) here being recapitulated may further include memory circuitry (e.g., 100). The circuitry (e.g., 5) here being recapitulated may still further include circuitry (e.g., 20) for successively applying each successive one of the data items (e.g., the FIG. 1 column A data items 0, 16, 4, 20, 8, 24, etc. in that column A order, or the FIGS. 8A-8C column A data items 0, 16, 32, 48, 4, etc. in that column A order) in each of the successive sets of data items to a data input port of the memory circuitry (e.g., 100). The circuitry (e.g., 5) here being recapitulated may yet further include circuitry (e.g., 242) for successively applying each of the addresses in each of the successive sets of addresses to read and write address ports of the memory circuitry (e.g., 100) in synchronism with application of each successive one of the data items in each of the successive sets of data items to the data input port (e.g., clock signal 30 may provide the specified synchronism) so that each successive one of the data items in each of the successive sets of data items is stored in the memory circuitry in the non-natural order as each of the data items (e.g., 50) is read out from a data output port of the memory circuitry in natural order (e.g., the order 0, 1, 2, 3, 4, etc. as described earlier in this specification).

The above-mentioned memory circuitry (e.g., 100) may be dual-port memory circuitry.

In circuitry (e.g., 5) as recapitulated above, only N of the data items may be stored in the memory circuitry (e.g., 100) at any one time (e.g., for the case in which N=32, FIG. 1 shows, by means of columns C, E, G, that at any one time, memory 100 contains only 32 data items; FIGS. 8A-8C columns C, E, and G demonstrate the same point for a case in which N=64).

In circuitry (e.g., 5) as recapitulated above, the circuitry (e.g., 40) for producing successive sets of addresses 242 may produce each of the addresses in each set of the addresses one after another in succession (e.g., in either FIG. 4 or FIG. 5 the address counter 210 produces only one count value at any one time, and the muxes 220 downstream from that counter permute each such count value to produce one corresponding read and write address value 242 at that time).

In circuitry (e.g., 5) as recapitulated above, the circuitry (e.g., 40) for producing successive sets of addresses (e.g., 242) may produce each of the addresses in each set of the addresses in a succession that is synchronized with output of each of the N data items (e.g., 20) from a radix $4^n2^m$ fast Fourier transform operation (e.g., 10).

It will be understood that the foregoing is only illustrative of the principles of this disclosure, and that various modifications can be made by those skilled in the art without departing from the scope and spirit of the disclosure. For example, it will be understood that n in the above expression "radix $4^n2^m$" or the like can have any integer value greater than 0, that m in the above expressions can be either 0 or 1, and that N in the above discussion can have any value given by the equation $N=4^n \times 2^m$.

What is claimed is:

1. Circuitry for reordering at least three successive sets of data items in a radix 4n2m fast Fourier transform ("FFT") operation comprising:

circuitry for producing at least three successive sets of addresses in synchronism with the at least three successive sets of data items, wherein:

the data items in each successive set of the data items are produced one after another in succession, the addresses in each successive set of the addresses are produced one after another in succession in synchronism with production of an associated one of the data items, and the order of pairs of adjacent bits in each address in each successive set of the addresses is reversed as compared to the order of the said pairs of adjacent bits in a corresponding address in an immediately preceding one of the sets of addresses;

memory circuitry;

circuitry for applying each successive set of the data items to a data input port of the memory circuitry; and circuitry for applying each successive set of the addresses to read and write address ports of the memory circuitry so that the data items of each successive set of the data items are stored in the memory circuitry as data items of an immediately preceding set of the data items are read out from a data output port of the memory circuitry.

2. The circuitry defined in claim 1 wherein the memory circuitry comprises dual-port memory circuitry.

3. The circuitry defined in claim 1 wherein the circuitry for applying each successive set of data items to the data input port of the memory circuitry applies each of the data items to the data input port in synchronism with production of that data item.

4. The circuitry defined in claim 3 wherein the circuitry for applying each successive set of the addresses to the read and write address ports of the memory circuitry applies each of the addresses in each set of the addresses to the read and write address ports of the memory circuitry in synchronism with application of the associated one of the data items to the data input port of the memory circuitry.

5. The circuitry defined in claim 1 wherein the data items are outputs of the a radix 4n2m FFT fast Fourier transform ("FFT") operation in non-natural order.

6. The circuitry defined in claim 5 wherein the addresses in each set of the addresses applied to the read and write address ports of the memory circuitry cause the data items read from the data output port of the memory circuitry to be in natural order.

7. The circuitry defined in claim 1 wherein each of the successive sets of data items consists of a predetermined number N of the data items, and wherein only N of the data items are stored in the memory circuitry at any one time.

8. The circuitry defined in claim 7 wherein the successive sets of addresses repeat with a period of $\log_2$ (N) when $\log_2$ (N) is odd, and with a period of 2 when $\log_2$ (N) is even.

9. A method for reordering at least three successive sets of data signal items in a radix 4n2m fast Fourier transform ("FFT") operation comprising:

producing signals indicative of at least three successive sets of addresses in synchronism with the at least three successive sets of data signal items, wherein:

the data items in each successive set of the data items are produced one after another in succession, the addresses in each successive set of the addresses are produced one after another in succession in synchronism with production of an associated one of the data items, and the order of pairs of adjacent bits in each address in each successive set of the addresses is reversed as compared to the order of the said pairs of adjacent bits in a corresponding address in an immediately preceding one of the sets of addresses;

applying each successive set of the data signal items to a data input port of memory circuitry; and applying each successive set of the addresses to read and write address ports of the memory circuitry so that the data signal items of each successive set of the data signal items are stored in the memory circuitry as data signal items of an immediately preceding set of the data signal items are read out from a data output port of the memory circuitry.

10. The method defined in claim 9 wherein the memory circuitry comprises dual-port memory circuitry.

11. The method defined in claim 9 wherein the applying each successive set of the data items to the data input port of the memory circuitry applies each of the data signal items to the data input port in synchronism with production of that data signal item.

12. The method defined in claim 11 wherein the applying each successive set of the addresses to the read and write address ports of the memory circuitry applies each of the addresses in each set of the addresses to the read and write address ports of the memory circuitry in synchronism with application of the associated one of the data signal items to the data input port of the memory circuitry.

13. The method defined in claim 9 wherein the data signal items are outputs of the a radix 4n2m FFT fast Fourier Transform ("FFT") operation in non-natural order.

14. The method defined in claim 13 wherein the addresses applied to the read and write address ports of the memory circuitry cause the data signal items read from the data output port of the memory circuitry to be in natural order.

15. The method defined in claim 9 wherein each of the successive sets of data signal items consists of a predetermined number N of the data signal items, and wherein only N of the data signal items are stored in the memory circuitry at any one time.

16. The method defined in claim 9 wherein the:

successive sets of addresses repeat with a period of $\log_2$ (N) when $\log_2$ (N) is odd, and with a period of 2 when $\log_2$ (N) is even.

17. Circuitry for reordering data items in each of at least three successive sets of N data items output successively in non-natural order from a radix 4n2m fast Fourier transform operation comprising:

circuitry for producing at least three successive sets of addresses in synchronism with the at least three successive sets of data items, wherein:

the data items in each successive set of the data items are produced one after another in succession, the addresses in each successive set of the addresses are produced one after another in succession in synchronism with production of an associated one of the data items, and the order of pairs of adjacent bits in each address in each successive set of the addresses is reversed as compared to the order of the said pairs of adjacent bits in a corresponding address in an immediately preceding one of the sets of addresses;

memory circuitry;

circuitry for successively applying each successive one of the data items in each of the successive sets of data items to a data input port of the memory circuitry; and circuitry for successively applying each of the addresses in each of the successive sets of addresses to read and write address ports of the memory circuitry in synchronism with application of each successive one of the data items in each of the successive sets of data items to the data input port so that each successive one of the data items in each of the successive sets of data items is stored in the memory circuitry in the non-natural order as each of the data items in the immediately preceding set of the data items is read out from a data output port of the memory circuitry in natural order.

18. The circuitry defined in claim 17 wherein the memory circuitry comprises dual-port memory circuitry.

19. The circuitry defined in claim 17 wherein only N of the data items are stored in the memory circuitry at any one time.

20. The circuitry defined in claim 17 wherein the circuitry for producing successive sets of addresses produces each of the addresses in each set of the addresses in succession.

21. The circuitry defined in claim 17 wherein the circuitry for producing successive sets of addresses produces each of the addresses in each set of the addresses in a succession that is synchronized with output of each of the N data items from the a radix 4n2m fast Fourier transform operation.

22. The circuitry defined in claim 21 wherein the successive sets of addresses repeat with a period of $\log_2(N)$ when $\log_2(N)$ is odd, and with a period of 2 when $\log_2(N)$ is even.

\* \* \* \* \*